United States Patent [19]
Talley

[11] Patent Number: 5,863,345
[45] Date of Patent: Jan. 26, 1999

[54] METHODS FOR REMOVING FOREIGN DEPOSITS FROM HARD SURFACES USING NON-CAUSTIC CLEANING COMPOSITION COMPRISING PEROXYGEN COMPOUND AND SPECIFIC SILICATE

[75] Inventor: Charles Bullick Talley, Highlands Ranch, Colo.

[73] Assignee: Charvid Limited Liability Company, Highlands Ranch, Colo.

[21] Appl. No.: 787,439

[22] Filed: Jan. 22, 1997

Related U.S. Application Data

[62] Division of Ser. No. 396,971, Mar. 1, 1995, Pat. No. 5,663,132.

[51] Int. Cl.$^6$ .............................. C23G 1/14; C11D 3/08; C11D 3/39; C11D 7/18

[52] U.S. Cl. .............................. 134/2; 510/197; 510/218; 510/219; 510/234; 510/238; 510/243; 510/244; 510/245; 510/254; 510/362; 510/365; 510/372; 510/375; 510/378; 510/403; 510/405; 510/434; 510/436; 510/511; 134/3; 134/25.2; 134/34; 134/35; 134/39; 134/40; 134/42

[58] Field of Search .................................. 510/218, 197, 510/219, 234, 238, 243, 244, 245, 254, 362, 365, 372, 375, 378, 405, 434, 436, 511; 134/40, 42, 34, 35, 39, 2.3, 25.2

[56] References Cited

U.S. PATENT DOCUMENTS

| | | | |
|---|---|---|---|
| 2,817,606 | 12/1957 | Barrett | 134/22 |
| 3,764,542 | 10/1973 | Natali et al. | 510/530 |
| 3,843,633 | 10/1974 | Weber | 252/543 |
| 3,901,819 | 8/1975 | Nakagawa et al. | 252/186 |
| 3,920,570 | 11/1975 | Mulders | 252/89 |
| 3,960,665 | 6/1976 | Villadsen et al. | 195/66 R |
| 3,968,047 | 7/1976 | Smeets | 252/95 |
| 3,982,892 | 9/1976 | Gray | 8/111 |
| 4,003,700 | 1/1977 | Gray et al. | 8/111 |
| 4,016,090 | 4/1977 | Nakagawa et al. | 252/186 |
| 4,028,282 | 6/1977 | Okumma et al. | 252/537 |
| 4,115,293 | 9/1978 | Schoenholz et al. | 252/102 |
| 4,196,093 | 4/1980 | Clarke et al. | 510/317 |
| 4,231,890 | 11/1980 | Yagi et al. | 252/186 |
| 4,279,769 | 7/1981 | Yagi et al. | 252/186 |
| 4,289,643 | 9/1981 | Joubert | 510/122 |
| 4,326,976 | 4/1982 | Logan et al. | 252/99 |
| 4,347,168 | 8/1982 | Murphy et al. | 252/547 |
| 4,374,474 | 2/1983 | Tai | 252/186.26 |
| 4,476,161 | 8/1988 | Pötschke | 8/543 |
| 4,518,516 | 5/1985 | Godard et al. | 510/220 |
| 4,615,820 | 10/1986 | Hepworth et al. | 252/139 |
| 4,619,779 | 10/1986 | Hardy | 252/91 |
| 4,655,953 | 4/1987 | Oakes | 252/99 |
| 4,761,161 | 10/1984 | Pötschke | 252/89.1 |
| 4,772,413 | 9/1988 | Massaux et al. | 252/102 |
| 4,795,584 | 1/1989 | Ross et al. | 252/174.23 |
| 4,820,440 | 4/1989 | Hemm et al. | 252/135 |
| 4,832,862 | 5/1989 | Joubert et al. | 510/230 |
| 4,876,023 | 10/1989 | Dickenson et al. | 252/90 |
| 4,933,103 | 6/1990 | Aoyagi et al. | 252/186.38 |
| 5,041,232 | 8/1991 | Batal et al. | 252/94 |
| 5,045,223 | 9/1991 | Batal et al. | 252/102 |
| 5,078,895 | 1/1992 | Dany et al. | 252/94 |
| 5,093,021 | 3/1992 | Coyne et al. | 252/91 |
| 5,167,854 | 12/1992 | Deleeuw et al. | 252/186.27 |
| 5,292,443 | 3/1994 | Esche, Jr. et al. | 252/42.7 |
| 5,292,446 | 3/1994 | Painter et al. | 510/381 |
| 5,340,496 | 8/1994 | Sato et al. | 252/186.27 |
| 5,360,568 | 11/1994 | Madison et al. | 252/102 |
| 5,370,826 | 12/1994 | Madison et al. | 252/102 |
| 5,456,850 | 10/1995 | Trabitzch et al. | 510/303 |
| 5,462,804 | 10/1995 | Kokubu et al. | 428/402.24 |
| 5,496,495 | 3/1996 | Beck et al. | 252/174.23 |
| 5,663,132 | 9/1997 | Talley | 510/218 |

FOREIGN PATENT DOCUMENTS 673 033 A5  1/1990  Switzerland.

OTHER PUBLICATIONS

Chem. abstr., vol. 116, No. 4, 27 Jan. 1992 (Columbus, OH, USA), p. 139, col. 2, the abstract No. 23442y, KRUSE et al., 'Stable bifunctional phosphate–free detergent tablets for use in mechanical dishwasher.' Ger. Offen. DE 4,010,524. 10 Oct. 1991.

*Primary Examiner*—Ardith Hertzog
*Attorney, Agent, or Firm*—Sheridan Ross, PC

[57] ABSTRACT

The present invention discloses an alkaline cleaning composition for cleaning heavily soiled surfaces such as food fryers, baking pans, high temperature pasteurizers, beer kettles and similar equipment that normally requires caustic soda based cleaners to clean. The present invention is also useful in cleaning ceramics such as restaurant grade ceramic china plates and platters. The present invention is particularly useful in cleaning brass and aluminum parts and equipment without causing corrosion damage. Further, since the cleaning composition of the present invention is not based on caustic soda, the composition is not considered hazardous. Further, the cleaning composition of the present invention dissolves readily in water, providing a solution that can be used in mechanical sprayers, soak-tanks and clean-in-place equipment. Also the cleaning composition may be effectively used at lower temperatures than caustic cleaning agents. In particular, a solution of the cleaning composition is effective at significantly less than 190° F.

24 Claims, No Drawings

METHODS FOR REMOVING FOREIGN DEPOSITS FROM HARD SURFACES USING NON-CAUSTIC CLEANING COMPOSITION COMPRISING PEROXYGEN COMPOUND AND SPECIFIC SILICATE

This is a divisional of application Ser. No. 08/396,971 filed Mar. 1, 1995 now issued as U.S. Pat. No. 5,663,132.

FIELD OF THE INVENTION

This invention relates generally to a cleaning composition and more specifically to an alkaline cleaning composition for removing protein, grease and other organic deposits from articles such as those used in the food industry.

BACKGROUND OF THE INVENTION

In the food processing industry, the cleaning of equipment is a significant problem. In many applications, the high temperatures employed cause difficult-to-remove organic deposits, such as baked-on carbon and hydrolyzed protein, to form on the equipment. In the dairy industry, for example, the pasteurizing equipment is heated to temperatures in excess of 160° F. to sterilize dairy products. At such temperatures, a blue-black organic deposit, that is very difficult to remove with known cleaners, commonly forms on the equipment.

Caustic cleaners are commonly used to remove organic deposits but caustic cleaners are unsafe and require substantially elevated temperatures to work effectively. Many caustic cleaners, such as those incorporating sodium hydroxide, are corrosive to skin and produce hazardous fumes. Such caustic cleaners can also corrode or scar metal (e.g., aluminum and brass), and destroy many types of floor, wall and countertop surfaces. For instance, sodium hydroxide should not be used on aluminum since reactions will occur which are corrosive to the metal. At temperatures in excess of 160° F., which are normally required to remove organic deposits, caustic cleaners can consume oxygen. In tanks and other types of substantially closed vessels, the consumption of oxygen can cause a decrease in the internal pressure of the vessel leading to vessel collapse.

To avoid the problems associated with caustic cleaners, noncaustic cleaners, which are typically not as effective as caustic cleaners, are employed in many applications. Because of the reduced effectiveness of the noncaustic cleaners, additional time and labor is required to remove stubborn organic deposits. Noncaustic cleaners are sometimes initially used to remove a portion of the organic deposits with the remainder being removed by caustic cleaners. In this manner, the use of caustic cleaners is reduced as much as possible.

There is a need for a non-hazardous cleaner for removing organic deposits, such as those encountered in the food industry, that is safe to use and will not damage the surfaces to be cleaned. Particularly, there is a need to provide a cleaner that is noncorrosive to skin and the surfaces to be cleaned and that will not consume oxygen at high temperatures.

There is a further need to provide a cleaner that is capable of removing organic deposits at relatively low temperatures.

There is a further need for an all purpose cleaner having a wide range of applications, including the removal of organic deposits from deep fat fryers or bakery pans, to replace caustic and noncaustic cleaners.

SUMMARY OF THE INVENTION

The present invention addresses these and other needs by providing a cleaning composition which includes at least a peroxygen compound, a metasilicate, a chelate and a builder. The cleaning composition is typically in a dry or granulated state and can be combined with a suitable carrier, typically water, to form a cleaning solution.

The peroxygen compound is preferably a perborate or a percarbonate and more preferably a percarbonate. The perborate or percarbonate preferably is complexed with a metal such as sodium, lithium, calcium, potassium or boron. The preferred percent by weight of the peroxygen compound in the cleaning composition, when in the dry or granular state, ranges from about 10% to about 40% and more preferably from about 25% to about 40%.

The metasilicate is preferably anhydrous. The preferred percent by weight of the metasilicate in the cleaning composition, when in the dry or granular state, ranges from about 10% to about 30%.

The chelate is preferably a derivative of a carboxylic or phosphonic acid. More preferably, the chelate is selected from the group consisting of ethylenediaminetetraacetic acid ("EDTA"), N-hydroxyethylenediaminetriaceticacid ("NTA"), and poly(alkylphosphonic acid). The preferred percent by weight of the chelate in the cleaning composition, when in the dry or granular state, ranges from about 3% to about 8%.

It is preferred that the peroxygen compound, metasilicate and chelate are all salts having the same cation. The preferred cation is sodium or potassium.

The builder is preferably at least one of the following compounds: a sodium carbonate (e.g., soda ash), sodium sesquicarbonate, sodium sulfate or sodium bicarbonate. The carbonate is preferably a hydrated carbonate such as trona. The preferred percent by weight of the builder in the cleaning composition, when in the dry or granular state, is from about 16% to about 75%.

The ratios of the various components are important in many applications. The preferred ratio of the peroxygen compound to the chelate ranges from about 7:1 to 3:1. The preferred ratio of the surfactant to the metasilicate ranges from about 4 to 1 to about 7 to 1 and more preferably is about five to one.

The cleaning composition can include a surfactant to act as a wetting agent, emulsifying agent, and/or dispersing agent. The preferred percentage by weight of the surfactant in the cleaning composition, when in the dry or granular state, ranges from about 2% to about 6%.

The cleaning composition can include a gelling agent for adhering the cleaning composition to a desired surface. Preferred gelling agents include carboxymethylcellulose, hydroxymethylcellulose and modified polyacrylamide. The preferred percent by weight of the gelling agents in the cleaning composition, when in the dry or granular state, ranges from about 5 to about 10%.

As noted above, the cleaning composition can be combined with water to form a cleaning solution. The cleaning solution preferably contains from about 92 to about 99% water by weight with the remainder constituting the cleaning composition. The pH of the cleaning solution preferably ranges from about pH 9 to about pH 12.

In another embodiment of the subject invention, the cleaning composition includes (a) at least about 10% by weight of a peroxygen compound; (b) a metasilicate; and (c) at least about 3% by weight of a chelate. The peroxygen compound, metasilicate and chelate are all salts having the same cation.

The cleaning composition can further include a surfactant and a builder as described above. In yet another embodiment of the present invention, a method for cleaning an object is provided including the steps of: (i) applying a cleaning solution to the object wherein the cleaning solution includes (a) at least about 25% by weight of a percarbonate compound; (b) a metasilicate; (c) a builder including at least one of the following: a sulfate, and a carbonate; and (d) a chelate; and (ii) removing the cleaning solution from the object. The object can be composed of a broad variety of materials, including a metal, such as brass, stainless steel, aluminum, or a ceramic or plastic material.

The method can further include one or more of the following steps: (i) soaking the object in the cleaning solution at a temperature less than about 190° F.; (ii) spraying the object with the cleaning solution at a temperature of less than about 100° F.; (iii) circulating the cleaning solution about the object at a temperature less than about 190° F.; and/or (iv) rinsing the object with water to remove the cleaning solution.

In many applications, the cleaning composition of the present invention is significantly more effective and safer than caustic cleaners in removing organic deposits. The cleaning composition can generally be used effectively at temperatures lower than the temperatures at which caustic cleaners are used. It is believed that, depending on the cleaning task and the duration of application, cleaning solutions according to the present invention typically need not be used at temperatures higher than about 100° F. In most applications, the cleaning composition is safer to use than caustic cleaners. Unlike many caustic cleaners, the cleaning composition generally does not produce dangerous fumes and is not corrosive to skin. The cleaning composition also does not corrode or scar metals such as aluminum, stainless steel, and brass. In high temperature tank cleaning operations, the cleaning composition can release oxygen and thereby produces a counter-pressure which helps prevent tank collapse.

The cleaning composition has a number of other advantages relative to existing cleaners. In some applications, the cleaning composition provides an all purpose cleaner that can replace existing caustic and noncaustic cleaners. The cleaning composition thereby reduces the labor and time required to clean equipment. In some applications, the cleaning composition is environmentally benign. The release of oxygen by the composition facilitates compliance of the cleaning solution with the regulations regarding chemical and biological oxygen levels in waste water. The cleaning composition thereby often requires little or no treatment in primary waste water treatment facilities, as generally required by many existing cleaners. In some applications, the cleaning composition has a pH level acceptable to municipal waste water treatment facilities. In particular, a pH level between 9 and 12 is expected from the use of the present cleaning composition.

DETAILED DESCRIPTION

The present invention provides an alkaline cleaning composition for cleaning heavily soiled surfaces especially in the processing and storing of foods. The cleaning composition removes a wide range of foreign deposits, such as grease, protein, baked-on carbon and charred organics, and other types of organic and inorganic deposits. The cleaning composition removes foreign deposits from a wide variety of objects such as food fryers, baking pans, high temperature pasteurizing equipment, beer kettles, ceramic china plates, platters, brass filters, metal, ceramic or plastic parts and equipment, aluminum baking pans, carpets, fabrics, and the like.

In a preferred embodiment, the cleaning composition includes (a) a peroxygen compound, (b) a metasilicate, (c) a builder, and (d) a chelate. Preferably, the cleaning composition is substantially free of chlorine-containing compounds and hydroxides. The cleaning composition is typically in a dry, granulated form which is dissolved in a carrier, such as water, to form a cleaning solution before use. The cleaning solution can be applied by a mechanical sprayer, soak-tank, or other suitable technique. In a preferred embodiment, the cleaning solution is effective at temperatures of no more than about 190° F., and more preferably no more than about 100° F.

While not wishing to be bound by any theory, it is believed that the peroxygen compound and chelate react synergistically to remove most foreign deposits. The peroxygen compound releases oxygen molecules which break down bonds in the foreign deposit. The chelate reacts with and ties up dissolved metals in the water which would otherwise react with and neutralize the oxygen. It is further believed hat the metasilicate and builder peptize or emulsify (e.g. solubilize) proteins or fat. The metasilicate and builder together provide sufficient alkalinity to sopanify the high levels of fat in many foreign deposits.

The peroxygen compound preferably includes a perborate or a percarbonate and more preferably a percarbonate. The perborate or percarbonate can be completed with a metal selected from the group including sodium, lithium, calcium, potassium, and boron. The cleaning composition preferably includes from about 10% to about 40% by weight, and more preferably from about 25% to about 40% by weight, of the peroxygen compound. The metasilicate is preferably an anhydrous metasilicate complexed with a metal selected from the group including sodium and potassium. The metasilicate can be replaced with a sesquisilicate. The cleaning composition preferably includes from about 10 to about 30% by weight of the metasilicate.

The chelate is preferably a derivative of a carboxylic or phosphonic acid. More preferably, the chelate is selected from the group consisting of EDTA, NTA, and other derivatives of a carboxylic acid or a derivative of a phosphonic acid, such as poly(alkylphosphonic acid), (e.g., sold under the trademark ACUSOL 505ND). The EDTA acid is preferably in the form of a salt, such as a sodium salt ("ETDA-$Na_4$") or a potassium salt, as the salt is more water soluble than the acid. The cleaning composition preferably includes from about 3 to about 8% by weight of the chelate.

It is preferred that the peroxygen compound, metasilicate, and chelate are all salts having the same cation. More preferably, all of the salts in the cleaning composition have the same cation. The preferred cation is sodium or potassium.

The builder preferably includes at least a sulfate or a carbonate and more preferably a sodium carbonate, sodium sesquicarbonate, sodium sulfate, and sodium bicarbonate. The carbonate is preferably a hydrated carbonate such as trona. The cleaning composition preferably includes from about 16 to about 75% by weight of the builder.

The ratios of the various components are important parameters in many applications. Preferably, the ratio by weight of the peroxygen compound to the chelator ranges from about 7:1 to 3:1 and more preferably is about 5:1. The preferred ratio of the surfactant to the metasilicate preferably ranges from about 10 to 1 and preferably is about 5:1.

The cleaning composition can further include a surfactant, such as a wetting agent, emulsifying agent, or dispersing agent. The surfactant must be functional in an alkaline solution. Suitable surfactants are nonionic, anionic and amphoteric surfactants. Preferred nonionic surfactants include octylphenoxy-polyethoxy-ethanol (e.g., sold under the trademark TRITON X-100), nonyl phenoxy ethyleneoxy ethanol (e.g., sold under the trademark IGEPAL CO730), pol,234yoxy ethoxylated ethanol (e.g., sold under the trademark RENEX ZO), glycol fatty esters (e.g., sold under the trademark HALLCO-376-N), fatty acid alkylanolamid (e.g, sold under the trademark ALKAMIDE 2110), cetyldimethyl amine oxide (e.g., sold under the trademark AMMONYX CO), aliphatic polyether (e.g., sold under the trademark ANTAROX LF-344), polyethylenated alkyl glycol amide (e.g., sold under the trademark ANTAROX G-200), fatty alcohol polyether (e.g., sold under the trademark AROSURE 63-PE-16), polyoxyethylene sorbitol esters of mixed fatty and resin acids (e.g., sold under the trademark ATLAS G-1234), modified oxyethylated straight-chain alcohol (e.g., sold under the trademark RENEX 648), modified oxyethoxylated straight-chain alcohols (e.g. sold under the trademark PLURAFAC RA,ZO), alkylaryl polyether (e.g., sold under the trademark TRITON CF10), trifunctional polyoxyalkylene glycols (e.g., sold under the trademark PLURADOT HA-410), diethylene glycol dioleate, polyethylene glycol recinaleate, polyethylene glycol dioleate, tridecyl alcohol, nonylphenol, and ethylene oxide condensation products that are based on propylene oxide-propylene glycol (e.g., sold under the trademark PLURONIC L-61). Preferred anionic, surfactants include ethoxylated (3 moles) phosphate ester (e.g., sold under the trademark TRITON QS-44), sodium sulfate of 2 ethyl-a-hexanol (e.g., sold under the trademark TERGITOL 08), sodium petroleum sulfonate (e.g., sold under the trademark PETRONATE K), sodium alkyl naphthahalene sulfonate (e.g., sold under the trademark PETRO AR, SELLOGEN K, NEKAL BX-78, ALKANOL B), dioctyl ester of sodium sulfosuccinic acid (e.g., sold under the trademark ABRESOL OT), sodium alkylaryl sulfonate (e.g., sold under the trademark AHCOWET ANS), sodium salt of sulfated alkylphenoxy poly(ethyleneoxy) ethanol (e.g., sold under the trademark ALIPAL EO-526), sodium methyl n-oleyl-taurate (e.g., sold under the trademark AMATER G T), alkyl polyphosphate (e.g., sold under the trademark ATCOWET C2), sodium lauryl sulfate (e.g., sold under the trademark AVIROL 101), sodium N-methyl-N-tall oil acid taurate (e.g., sold under the trademark IGEPON TK-32), lauric alkyloamine condensate (e.g., sold under the trademark NOPCOGEN 14-L), fatty alcohol sulfate modified (e.g. sold under the trademark RICHOLOL 4940) and modified diethanolamides of fatty acids (e.g., sold under the trademark SHERCOMID). Preferred amphoteric surfactants include disodium N-tallow betamino dipropionate (e.g., sold under the trademark DERIPHATE 154), sodium derivative of dicarboxylic caprylic acid (e.g., sold under the trademark MIRANOL J2M, letithin (e.g., sold under the trademark CENTROL CA, LA), lauryl ampholytic (syndet) (e.g., sold under the trademark SCHERCOTERIC BASE 156), carboxylic acid derivatives of substituted imidazolines (e.g., sold under the trademark MONATERIC), complex coco betaine (e.g., sold under the trademark CARSONAM 3 AND 3147), fatty sulfobetaine (e.g., sold under the trademark LONZAINE CS), dicarboxylic coconut derivative triethanolamine (e.g., sold under the trademark MIRANOL TEA), dicarboxylic octoic derivative sodium salt (e.g. sold under the trademark MIRANOL JEM), dicarboxylic myristic derivative diethanolamine (e.g., sold under the trademark MIRANOL M2M-DEM), dicarboxylic myristic derivative monoethanolamine (e.g., sold under the trademark MIRANOL M2M-MEA), dicarboxylic myristic derivative sodium salt (e.g., sold under the trademark MIRANOL M2M-SF), dicarboxylic capric derivative diethanolamine (e.g., sold under the trademark MIRANOL S2M-DEA), and dicarboxylic capric derivative triethanolamine (e.g., sold under the trademark MIRANOL S2M-TEA). Preferably, the cleaning composition contains from about 0 to about 8% by weight, and more preferably from about 0.5 to about 6% by weight of the surfactant.

The cleaning composition can include a phosphate to help the chelate bind up free metals and keep soils in suspension. The preferred phosphate is sodium or potassium tripolyphosphate. The cleaning composition preferably includes from about 5 to about 25% by weight of the phosphate.

The cleaning composition can also include a gelling agent to provide a gel formulation for applying the cleaning composition to soiled objects. The cleaning ability of the cleaning composition is facilitated by the adherence properties of the gel. For instance, such gel formulations are particularly useful for thick charred organic buildups on barbecue grills. Preferred gelling agents include carboxymethyl cellulose, hydroxymethylcellulose and modified polyacrylamide. The preferred concentration of the gelling agent in the cleaning composition ranges from about 6 to 12% by weight.

To apply the cleaning composition with a gelling agent, the cleaning composition is preferably combined with from about 7 to about 14 parts by weight water and the mixture is placed in a pressurized vessel at about 160 psi. As the pressure is released, the mixture is ejected from the vessel onto the object to be cleaned. The mixture can include a foam builder such as nonylphenoxy polyethoxyethanol to enhance the foaming characteristics of the mixture.

The above-noted components of the cleaning composition are combined by suitable techniques for forming granulated cleaners. For example, the various components are added to a vessel, with the builder being added first, the surfactant second, the phosphate third, the metasilicate fourth, the peroxygen compound fifth, and the gelling agent sixth, and the various components are blended with a suitable device. In the preceding steps, the peroxygen compound must be maintained separate from water and the surfactant as the peroxygen compound will react with water and/or the surfactant, thereby releasing oxygen and neutralizing the peroxygen compound.

Thus, the surfactant must be added to the vessel before the peroxygen compound.

As noted above, the cleaning composition is preferably a dry, granular material. Before use, the cleaning composition can be dissolved in water, or other suitable carrier, to form a cleaning solution. The preferred concentration of the cleaning composition in the cleaning solution is discussed below. The cleaning solution preferably has pH ranging from about pH 8 to about pH 12 and more preferably from about pH 10 to about pH 11.

The method for using the cleaning solution to remove organic deposits from an object will now be described. Before applying the steps described below, the various components of the cleaning composition are combined in the appropriate amounts and ratios to provide the cleaning composition.

In the first step, the cleaning composition is combined with water to form the cleaning solution and the cleaning solution applied to the object. The cleaning solution is applied to the object for a sufficient period of time to remove the foreign deposit. Preferably, the application is effectuated by soaking the object in the cleaning solution in a soak-tank or spraying the cleaning solution on the object. The soaking of the object can be accomplished by circulating the cleaning solution about the object. The temperature of the cleaning solution is preferably no more than about 190° F., more preferably less than about 140° F., and most preferably less than about 100° F. The time required to solubilize most foreign deposits into the cleaning solution is preferably no more than about 8 hours for soaking techniques and no more than about 2 hours for spraying techniques.

The concentration of the cleaning composition in the cleaning solution depends upon the type of foreign deposit and application technique. In most applications, the preferred aqueous concentration of the cleaning agent in the cleaning solution ranges from about 2 to about 8 percent by weight. For soak-tank applications, the cleaning solution more preferably contains from about 3% by weight of the cleaning composition for cleaning heavily soiled, carbonized baking pans; about 0.5% by weight of the cleaning composition (at 140° F.) for cleaning brewery kettles; about 2% by weight of the cleaning composition for cleaning objects having carbon or protein deposits; and as much as 5% by weight of the cleaning composition for cleaning other types of heavy soiled objects. For spray and other clean-in-place applications, the cleaning solution more preferably has a concentration of the cleaning composition ranging from about 0.25% to about 5% by weight. However, because of the pressure with which the cleaning solution is applied in these operations, a somewhat lower concentration may be used than for comparable cleaning required for mechanical soak-tank cleaning.

After the appropriate time, the cleaning composition is removed from the object. Typically, the cleaning solution is removed by rinsing the object with water. After removal, the cleaning solution typically has a pH ranging from about pH 9 to about pH 12.

EXAMPLES

The present cleaning composition will now be further described by reference to the following illustrative examples in which all references to "parts" and percentages are on a weight basis.

Example No. 1

For cleaning a deep fat fryer, an aqueous solution having a 2.4% by weight concentration of the present cleaning composition was placed in the deep fat fryer and allowed to sit at ambient room temperature without agitation for 8 hours. The solution was removed and the fryer rinsed with water. The deep fat fryer had over 90% of the carbon removed without scouring or rubbing of any kind. When compared against a standard caustic cleaner comprised of 80% by weight caustic soda, 15% by weight builder and 5% by weight surfactant, using the same soak time, temperature and concentration, only 40% of the carbon was removed. Furthermore, when the caustic cleaner was used at 190° F. for 4 hours at 2.4% by weight, the deep fat fryer was only 80% clean.

Example No. 2

For cleaning bakery pans, a solution having a 2.4% by weight concentration of the present cleaning composition was used for immersing aluminum bakery pans for 3½ hours at 120° F. The pans were initially covered with baked-on carbon from the commercial ovens as well as typical food soils and food stains. After the 3½ hour soak, all carbon and food soils were removed without agitation, scouring or rubbing. Note that no standard caustic cleaner could be used on the aluminum pans without major damage to the pans. Further note that normal silicated bakery pan cleaners will not remove carbon due to their lack of penetrating power.

In addition to the above examples, it has been determined that heavily soiled, carbonized baking pans at ambient room temperature can be effectively cleaned by soaking in a solution having a 3% by weight concentration of the present cleaning composition.

Example No. 3

For removing protein and beer stone deposits in a micro brewery, a solution having a 1% by weight concentration of the present cleaning composition was circulated about the deposits at 150° F. for 30 minutes. The cleaning effectiveness was compared against a standard liquid and a soda powder chlorinated caustic cleaner. In each case the present cleaning composition outperformed the caustic cleaners in protein and beer stone removal, at lower temperatures and in substantially less time (in most cases the time was ¼ to ⅓ of the normal time required for the caustic cleaners).

The two caustic cleaners (one a powder and one a liquid) against which the present cleaning composition was compared had the following ingredients:

|  | Powder (% by weight) | Liquid (% by weight) |
| --- | --- | --- |
| Caustic Soda Beads | 30 | — |
| Caustic Soda Liquid 50% | — | 40 |
| Polymer (ACUSOL 44) | — | 6 |
| Sodium Tripolyphosphate | 25 | — |
| Soda Ash Dense | 29 | — |
| Sodium Hypochlorite | — | 20 |
| Sodium Dichloroisocyanurate | 3.0 | — |
| surfactant (PLURONIC 25R2) | 2.0 | — |
| Sodium Sulfate | 10.0 | — |
| Water | — | 28.0 |
| Potassium Silicate | — | 6.0 |

Further note that it has been determined that using a 0.5% by weight solution at 140° F. is effective for cleaning brewery kettles.

Example No. 4

For cleaning brass beer filters a solution having a 2% by weight concentration of the present cleaning composition was applied at 180° F. for 20 minutes to brass beer filters. The present cleaning composition removed all visible protein and charred organics which had accumulated from several years of beer processing. The normal cleaning agent used 3% by weight sodium hydroxide and was typically circulated for 2 hours. This process removed soils, but caused great corrosive and oxidation damage to the filters. The present cleaning composition did a better job at lower temperatures in less time and did not damage the filters. The calculated metal loss from corrosion was 11 ppm for the solution having the present cleaning composition as compared to 1,000 ppm when using the normal caustic cleaning agent.

Example No. 5

For cleaning barbecue grills, a solution having a concentration of 1 lb. of the present cleaning composition dissolved in 5 gallons of water was used. The barbecue grills, which were caked with grease and baked-on carbon, were soaked overnight in the solution at ambient room temperature. This resulted in 98% of all carbon and food soils being removed upon rinsing with a slight spraying action and with a slight rubbing of the grills. Almost no residue or evidence of the grease or carbon was visible in the waste water after soaking was complete. Note that the standard caustic cleaners had very little effect.

Example No. 6

For cleaning restaurant grade ceramic china, a solution having a concentration of 16 oz. of the present cleaning composition dissolved in 5 gallons of water was used. Restaurant grade ceramic china plates and platters were immersed in the solution for 3 hours at ambient room temperature. In everyday use these plates and platters are heated in an oven at 400° F. with steak and other red meat foods on them. The plates and platters are also placed directly on a heated grill surface that heats to over 500° F. The plates and platters were initially covered with baked-on carbon, grease and other food soils as well as discoloration stains. After the plates and platters were washed with conventional cleaners in a dishwasher and by hand scrubbing, they still were covered with brown and black spot stains and baked-on carbon. They had also become yellow in color instead of their original white. After the 3 hour soak in the solution of the present invention at ambient room temperature, the plates became clean and whitened.

Example No. 7

Standard clean-in-place procedures at a dairy includes mixing a caustic powdered cleaner in water at 185° F. and circulating the mixture through milk lines tanks and an high-temperature short-time pasteurizer for 45 minutes. The resulting waste water is discharged at a pH of 14. The caustic powdered cleaner had the following composition:

| Caustic Soda | 90.0% by weight |
| Builder | 5.0% by weight |
| Sodium Gluconate | 3.0% by weight |
| Wetting Agent | 2.0% by weight |

A solution having a concentration of 1 lb. of the cleaning composition dissolved in 5 gallons of water and heated to 185° F. was used in the same manner. That is, the solution was circulated for 45 minutes in the same manner as with the caustic cleaner. The cleaning results were far superior. All lines, valves and tanks were fully cleaned. Scalded areas that needed manual scrubbing after the caustic cleaning procedure were non-existent after circulating the solution having the present cleaning composition. Further, the high-temperature short-time pasteurizer had previously always required manual scrubbing and cleaning on its last 15 to 20 plates at the far end of the high temperature side of the press after each caustic cleaning. However, after the cleaning with the present cleaning composition, all plates including the very last one were fully cleaned. No manual scrubbing was required and the waste water discharge was pH 7 to pH 9.

As an aside, note that the high pH 14 of the caustic waste water discharged by the dairy when using the caustic powdered cleaner is unacceptable to local municipal waste water treatment facilities. However, a pH of pH 7 to pH 9 is acceptable.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for cleaning an object, comprising:
    contacting a liquid carrier with a free-flowing particulate composition to form a cleaning solution, the particulate composition comprising (a) a peroxygen compound; (b) at least one of an anhydrous metasilicate or sesquisilicate; (c) at least one of the following: a sulfate or a carbonate; (d) a chelate that is a compound other than a metasilicate, a sesquisilicate, or a phosphate; (e) at least one of a hydrated metasilicate or sesquisilicate; and (f) a phosphate;
    applying the cleaning solution to the object to remove foreign deposits from the object; and
    removing said cleaning solution from the object wherein the object has at least one of a metal or ceramic surface.

2. The method as claimed in claim 1, wherein the object has a surface of brass, stainless steel, aluminum, or plastic.

3. The method as claimed in claim 1, wherein the particulate composition comprises at least about 25% by weight of the peroxygen compound.

4. The method as claimed in claim 1, wherein the object has a surface with an organic deposit, and further comprising the step of solubilizing said organic deposit into said cleaning solution.

5. The method as claimed in claim 1 wherein said step of applying includes soaking the object in said cleaning solution at a temperature less than about 190° F.

6. The method as claimed in claim 1, wherein said step of applying includes spraying the object with said cleaning solution at a temperature of less than about 100° F.

7. The method as claimed in claim 1, wherein said step of applying includes circulating said cleaning solution about the object at a temperature less then about 190° F.

8. The method as claimed in claim 1, wherein said cleaning solution is in the form of a gel for adhering to the object.

9. The method as claimed in claim 1, wherein said step of removing is performed by rinsing with water.

10. The method as claimed in claim 1, wherein said step of removing includes discharging waste water having a pH of about pH 9 to pH 12.

11. The method as claimed in claim 1, wherein said free flowing particulate composition comprises no less than about 10% by weight of said at least one of an anhydrous metasilicate or sesquisilicate.

12. The method as claimed in claim 1, wherein said free-flowing particulate composition further comprises a gelling agent.

13. The method as claimed in claim 1, wherein the chelate is selected from the group consisting of a carboxylic acid and salt thereof, phosphonic acid and salt thereof, and mixtures thereof.

14. The method as claimed in claim 1, wherein the free-flowing particulate composition comprises no less than about 3% by weight of the chelate.

15. The method as claimed in claim 1, wherein the free-flowing particulate composition comprises no more than about 40% by weight of the peroxygen compound.

16. The method as claimed in claim 1, wherein the free-flowing particulate composition comprises from about 10 to about 30% by weight of the at least one of an anhydrous metasilicate or sesquisilicate.

17. The method of claim 1, wherein the free-flowing particulate composition comprises from about 16 to about 75% by weight of said sulfate or carbonate.

18. The method as claimed in claim 1, further comprising a surfactant.

19. The method as claimed in claim 1, wherein the free-flowing particulate composition further comprises a surfactant and wherein the surfactant is from about 0.5 to about 6% by weight of the free-flowing particulate composition.

20. The method as claimed in claim 1, wherein the liquid carrier is water.

21. A method for cleaning an object, comprising:

contacting a liquid carrier with a free-flowing particulate composition to form a cleaning solution, the particulate composition comprising (a) a peroxygen compound; (b) at least one of an anhydrous metasilicate or sesquisilicate; (c) at least one of the following: a sulfate or a carbonate; (d) a chelate that is a compound other than a metasilicate, a sesquisilicate, or a phosphate; and (e) a phosphate;

applying the cleaning solution to the object to remove foreign deposits from the object; and removing said cleaning solution from the object wherein the object has at least one of a metal or ceramic surface.

22. A method for cleaning an object, comprising:

contacting a liquid carrier with a free-flowing particulate composition to form a cleaning solution, the particulate composition comprising (a) a peroxygen compound; (b) a silicate selected from the group consisting of an anhydrous metasilicate, an anhydrous sesquisilicate, and mixtures thereof; (c) at least one of the following: a sulfate or a carbonate; (d) a chelate selected from the group consisting of ethylenediaminetetraacetic acid, N-hydroxyethylenediaminetriacetic acid, and poly(alkylphosphonic acid) and mixtures thereof; and (e) a gelling agent;

applying the cleaning solution to the object to remove foreign deposits from the object; and removing said cleaning solution from the object wherein the object has at least one of a metal or ceramic surface.

23. A method for cleaning an object, comprising:

contacting a liquid carrier with a free-flowing particulate composition to form a cleaning solution, the particulate composition comprising (a) a peroxygen compound; (b) at least one of an anhydrous metasilicate or sesquisilicate; (c) at least one of the following: a sulfate or a carbonate; (d) a chelate that is a compound different from a metasilicate or a sesquisilicate; and (e) at least one of a hydrated metasilicate or sesquisilicate; wherein the cleaning solution is in the form of a gel for adhering to the object;

applying the cleaning solution to the object to remove foreign deposits from the object; and removing said cleaning solution from the object wherein the object has at least one of a metal or ceramic surface.

24. A method for cleaning an object, comprising:

contacting a liquid carrier with a free-flowing particulate composition to form a cleaning solution, the particulate composition comprising (a) a peroxygen compound; (b) at least one of an anhydrous metasilicate or sesquisilicate; (c) at least one of the following: a sulfate or a carbonate; (d) a chelate that is a compound different from a metasilicate or a sesquisilicate; (e) at least one of a hydrated metasilicate or sesquisilicate; and (f) a gelling agent;

applying the cleaning solution to the object to remove foreign deposits from the object; and removing said cleaning solution from the object wherein the object has at least one of a metal or ceramic surface.

* * * * *